Jan. 31, 1956  C. L. CAMPBELL  2,732,909
SCRUBBER PURIFIER
Filed March 23, 1953
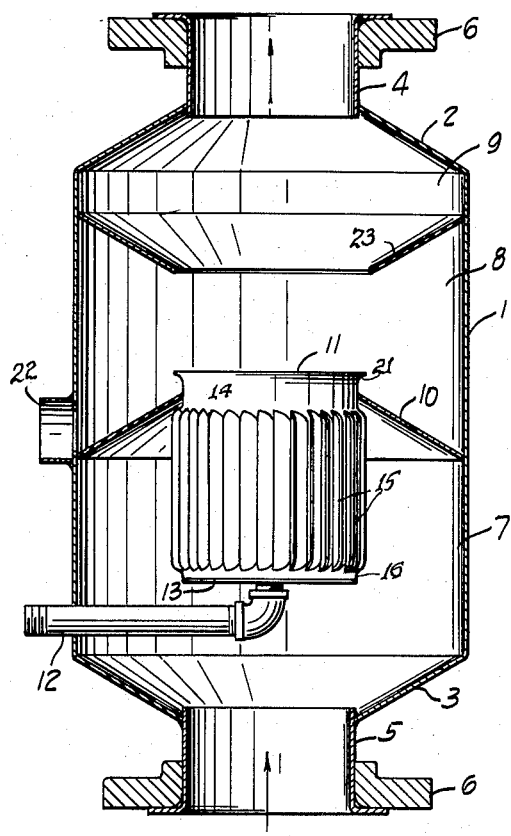
Fig. 1
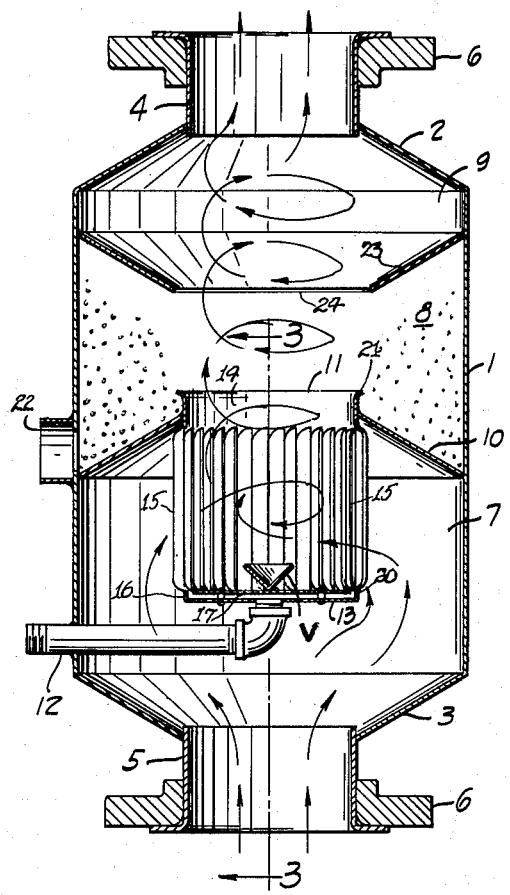
Fig. 2
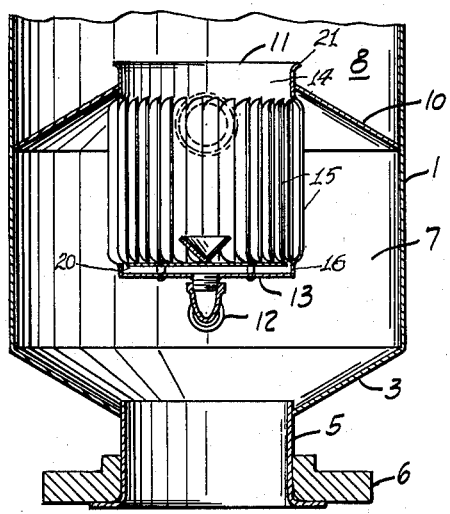
Fig. 3
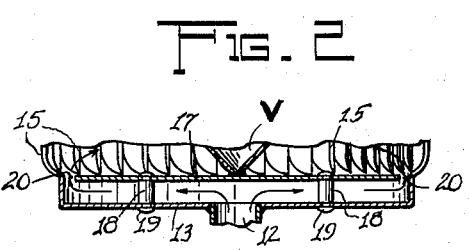
Fig. 4
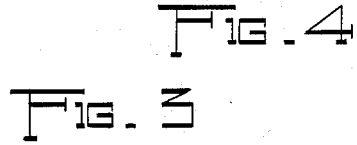
INVENTOR.
C. LANGDON CAMPBELL
BY
ATTORNEY

United States Patent Office 2,732,909
Patented Jan. 31, 1956

2,732,909

SCRUBBER PURIFIER

Charles Langdon Campbell, Painesville, Ohio, assignor to Centrifix Corporation, Cleveland, Ohio, a corporation of Ohio Application March 23, 1953, Serial No. 344,142

7 Claims. (Cl. 183—21)

My invention relates to line contacting and purifying means adapted to be placed in a fluid line and which is adapted particularly for the removal of very fine particles, such as dust or smoke, from a fluid in which the same is entrained.

It is one of the objects of the present invention to provide a line contacting and purifying unit of the type defined above in which the unit is devoid of moving parts.

Another object of this invention is the provision of means of the above named character which possesses high operating efficiency at a negligible pressure drop.

Another object of the invention consists in the provision of means of the above named character having a contacting chamber, a separation chamber, and an expansion chamber in substantially axial alignment within the unit.

A further object of the invention is the provision of a contacting and separation unit of the type defined which is extremely simple in construction and easy to install.

A further object is the provision of means for contacting a whirling laden fluid moving toward a vortex with a fluid exposed marginally with respect to the whirling fluid body.

Another object is the provision of a fixed tuyere through which a laden fluid is passed, the tuyere being provided with a contacting liquid chamber in its base, together with means for uniformly distributing the liquid outwardly toward the perimeter of the chamber for contact with the fluid passing into the tuyere.

Other objects and advantages of my invention will become more apparent as the following description of an embodiment thereof progresses, reference being made to the accompanying drawing in which like reference characters are employed to designate like parts throughout the same.

In the drawings:

Figure 1 is a vertical section through a contacting and purifying unit embodying the present invention, the tuyere being shown in elevation;

Figure 2 is a view similar to that shown in Fig. 1 in which the tuyere is shown in vertical section and in which the path of fluid stream through the unit is indicated by arrows;

Figure 3 is a section taken on line 3—3 of Fig. 2; and

Figure 4 is a slightly enlarged fragmentary section through the base of the tuyere.

Referring more particularly to the drawings, I carry out my invention by providing a hollow cylindrical body 1 which may be formed of sheet metal or may be cast, the upper and lower ends of the cylinder terminating in upwardly converging and downwardly converging walls 2 and 3, respectively. The converging end walls 2 and 3 in cross section may be defined as being of frusto-conical shape, and are provided with axial openings into which are secured the outlet and inlet tubes 4 and 5, respectively, these respective tubes extending outwardly beyond the ends of the body of the unit and are each provided with flanges 6 by which means the device may be secured in a fluid line in which it is desired to use the unit.

The interior of the cylindrical body is divided into three chambers, the chamber 7 being a contacting chamber on the inlet side of the line, the chamber 8 comprising the separation chamber, while the chamber 9 may be termed an expansion chamber which leads directly to the outlet tube 4.

A baffle 10 of frusto-conical shape and cross section separates the contact chamber from the separation chamber and is secured along its widest diameter to the interior of the cylindrical wall 1 by suitable means, such as by brazing or welding. The baffle is provided with an axial central opening into which fits the upper open end of a tuyere indicated generally at 11. The tuyere is secured to the walls defining the central opening of the baffle 10 by suitable means, and extends downwardly into the contacting chamber 7 where it is connected to a water pipe 12. The pipe 12 is connected to a suitable source of water and extends through the cylindrical casing 1 to and through the bottom wall 13 of the tuyere 11 at a point which is preferably in alignment with the axis of the tuyere to deliver a supply of water to the tuyere for purposes which will be explained more fully hereinafter.

The tuyere 11 comprises a cylindrical body having a closed bottom identified by the bottom wall 13 and is open at its other end into the separating chamber 8. That portion of the tuyere which extends from a point near the bottom wall upwardly to the imperforate neck portion 14 is formed into a plurality of substantially vertical tangentially arranged blades 15 extending around the tuyere body and spaced apart to provide vertically arranged openings whereby a laden fluid entering through the inlet tube 5 and into the chamber 7 will pass inwardly of the tuyere between the tangential blades and will consequently be subjected to a whirling motion within the tuyere. That portion of the bottom of the tuyere defined by the bottom wall 13 and the peripheral wall 16 provide a receptacle or pan within the tuyere within which a contacting liquid level is maintained. Spaced above the tuyere bottom wall 13 and substantially in the plane of the lower extremities of the series of blades 15 is provided a plate 17 mounted on supports 18 which may be secured to the plate and the tuyere bottom wall 13 in any suitable manner, such as the headed fasteners 19 and the spacer sleeves 18.

The peripheral edge 20 of the plate lies close to the lower extremities of the blades 15 but is spaced therefrom. In this manner the level of the water or other contacting liquid in the pan 16 can be maintained below the lower extremities of the blades and in close proximity thereto, the only exit for the liquid being through the annular restricted space 20 and upwardly within the tuyere body. Thus, as a laden fluid enters the contacting chamber 7 and passes upwardly and between the spaced tangential blades 15, it will be subjected to a violent whirling within the tuyere. The inrushing fluid passing into the tuyere in the vicinity of the annular space 20 will pick off particles of liquid from the liquid body exposed at 20 and will entrain them in the flow. The low pressure areas around the bottom of and within the tuyere and in the vicinity of the space 20, of course, further promote the efficient entrainment of the liquid particles in the laden fluid to contact them intimately with the particles in the laden fluid. As the laden fluid whirls upwardly within the tuyere, it carries with it the further burden of liquid particles with which it has been contacted and this fluid stream passes upwardly through the imperforate mouth or neck of the tuyere while still whirling at high velocity.

A vortex breaker may be provided within the tuyere and may comprise an inverted cone shaped member V secured at its apex to the top surface of the plate 17.

It will be noted that the outer peripheral edge of the tuyere neck 14 is formed into an upwardly and outwardly curved annular lip 21. As the laden fluid and liquid particles pass into the chamber 8, the centrifugal forces set up within the whirling mass cause the contacted particles of dust or smoke with which the fluid column is laden to be drawn upwardly and outwardly toward the inner cylindrical wall of the chamber 8, the heavier particles flowing over the lip 21 to drop against the baffle 10 to be drained toward the drain outlet 22. Other droplets of water laden with dust or smoke particles will be thrown by centrifugal force toward the inner side walls of the chamber 8 and will drain down the side walls toward the drain outlet 22, where the same may be removed from the unit.

I have provided a baffle of frusto-conical cross section which is indicated at 23 and which has a central opening 24 in alignment with the axis of the tuyere and spaced above the open end of the tuyere which serves as a partition between the separation chamber 8 and the expansion chamber 9. As the whirling fluid passes upwardly from the chamber 8 into the chamber 9, it is permitted to expand within the chamber 9 before it passes outwardly through the outlet tube 4. This tends to decelerate the whirling motion of the fluid column and may even result in further minor separation of particles which would, of course, be deposited upon the downwardly inclined circular wall 23 of the baffle or partition to be deposited within the separation chamber 8.

In Fig. 2, I have illustrated, by the use of arrows, the general direction of flow first of the laden column of fluid entering the inlet 5 to the contacting chamber and thence into the tuyere where the high velocity whirling action is imparted to the laden fluid column. These arrows show the progress of the column upwardly through the chambers 8 and 9 and outwardly through the outlet 4.

I have illustrated the invention in the drawing as being of the up-flow type, but I do not restrict the invention to this type since the same may be applied in a down-flow type of separation.

Various changes may be made in the details of construction and arrangement of parts of the invention without departing from the spirit thereof or the scope of the appended claims.

I claim:

1. A contacting and purifying device comprising a cylindrical body having inlet and outlet openings, a wall within said body having an axial opening and dividing the body into a contacting chamber and a separation chamber, a fixed tuyere in said contacting chamber, means for supplying a shallow water level in the bottom of the tuyere, and an inverted frusto-conical baffle wall having an axial opening and secured within the body between the tuyere and the outlet opening of the body to provide an expansion chamber in said body adjacent said outlet, said tuyere having a bottom wall and comprising a plurality of spaced tangentially arranged blades extending upwardly from a point adjacent the bottom wall, and an imperforate neck portion secured within and extending beyond the opening of said first wall, said neck portion having a peripheral lip extending upwardly and curved outwardly thereof and into said separation chamber, that portion of the tuyere extending from said bottom wall upwardly to the bottom extremities of said blades constituting a shallow liquid reservoir, a liquid supply means for said reservoir, and a transverse member spaced from said blade extremities and spaced above and supported on said bottom wall.

2. A scrubber purifier comprising a cylindrical body having opposed inlet and outlet openings for a fluid column, a pair of transverse walls within said body dividing the body into a plurality of chambers, said walls each having axial openings and being inclined toward each other and inwardly from the cylindrical body wall toward the axis of the body, a fixed centrifugal tuyere having a closed bottom and an open top end secured near its open end within the axial opening of one of said walls and a series of elongate openings in said tuyere, tangentially disposed blades adjacent each tuyere opening, said tuyere closed bottom comprising a shallow receptacle for a body of liquid within the tuyere, means for feeding a liquid to said receptacle, and means within the tuyere and said receptacle to confine dispersal of particles of liquid from the liquid body to a peripheral area adjacent said blades.

3. A scrubber purifier comprising a cylindrical body having opposed inlet and outlet openings for a fluid column, a pair of transverse walls within said body dividing the body into a plurality of chambers, said walls each having axial openings and being inclined toward each other and inwardly toward the axis of the body, a fixed centrifugal tuyere having a closed bottom and an open top and secured near its open end within the axial opening of one of said walls and a series of elongate openings in said tuyere, tangentially disposed blades adjacent each tuyere opening, said tuyere closed bottom comprising a shallow receptacle for a body of liquid within the tuyere, means for feeding a liquid to said receptacle, and means within the tuyere and said receptacle to confine dispersal of particles of liquid from the liquid body to a peripheral area adjacent said blades, said last named means including a plate supported on said tuyere bottom and in spaced relation thereto.

4. A scrubber purifier comprising a cylindrical body having opposed inlet and outlet openings for a fluid column, a pair of transverse walls within said body dividing the body into a plurality of chambers, said walls each having axial openings and being inclined toward each other and inwardly toward the axis of the body, a fixed centrifugal tuyere having a closed bottom and an open top and secured near its open end within the axial opening of one of said walls and a series of elongate openings in said tuyere, tangentially disposed blades adjacent each tuyere opening, said tuyere closed bottom comprising a shallow receptacle for a body of liquid within the tuyere, means for feeding a liquid to said receptacle, and means within the tuyere and said receptacle to confine dispersal of particles of liquid from the liquid body to a peripheral area adjacent said blades, said last named means including a plate supported on said tuyere bottom and in spaced relation thereto, the periphery of said means being in close proximity to but spaced from the lower extremities of said blades.

5. A scrubber purifier comprising a cylindrical body having opposed inlet and outlet openings for a fluid column, a pair of transverse walls within said body dividing the body into a plurality of chambers, said walls each having axial openings and being inclined toward each other and inwardly toward the axis of the body, a fixed centrifugal tuyere having a closed bottom and an open top end secured near its open end within the axial opening of one of said walls and a series of elongate openings in said tuyere, tangentially disposed blades adjacent each tuyere opening, said tuyere closed bottom comprising a shallow receptacle for a body of liquid within the tuyere, means for feeding a liquid to said receptacle, means within the tuyere and said receptacle to confine dispersal of particles of liquid from the liquid body to a peripheral area adjacent said blades, and a vortex breaker within the tuyere bladed area and supported on said last named means.

6. A scrubber purifier comprising a cylindrical body having opposed inlet and outlet openings for the passage of a fluid column, a pair of oppositely disposed frusto-conical walls secured within said body and dividing the body into a plurality of chambers including a contacting chamber, a separation chamber and an expansion chamber, said frusto-conical walls each having aligned axial openings for the passage of the fluid column therethrough, a fixed centrifugal tuyere supported in said contacting chamber and having a closed bottom and an open top end and a series of elongate openings in said tuyere, tangentially disposed blades adjacent each tuyere opening, said tuyere closed bottom comprising a shallow receptacle for a body of liquid within the tuyere, said tuyere having an imperforate neck portion extending through the opening in one of said frusto-conical walls and terminating beyond said opening in an annular outwardly curved lip, said other frusto-conical wall extending toward its axial opening in a direction toward said curved lip.

7. A scrubber purifier comprising a cylindrical body having opposed inlet and outlet openings for the passage of a fluid column, a pair of oppositely disposed frusto-conical walls secured within said body and dividing the body into a plurality of chambers including a contacting chamber, a separation chamber and an expansion chamber, said frusto-conical walls each having aligned axial openings for the passage of the fluid column therethrough, a fixed centrifugal tuyere supported in said contacting chamber and having a closed bottom and an open top end and a series of elongate openings in said tuyere, tangentially disposed blades adjacent each tuyere opening, said tuyere closed bottom comprising a shallow receptacle for a body of liquid within the tuyere, said tuyere having an imperforate neck portion extending through the opening in one of said frusto-conical walls and terminating beyond said opening in an annular outwardly curved lip, said other frusto-conical wall extending toward its axial opening in a direction toward said curved lip, the space between said oppositely disposed frusto-conical walls constituting the separation chamber, one of said walls being spaced from but adjacent to the outlet opening of the cylindrical body and constituting therebetween an expansion chamber for the fluid column passing therethrough.

References Cited in the file of this patent

UNITED STATES PATENTS

| | | |
|---|---|---|
| 1,310,633 | Roberts | July 22, 1919 |
| 1,870,351 | Wagner | Aug. 9, 1932 |
| 2,059,522 | Hawley | Nov. 3, 1936 |
| 2,117,718 | Hawley | May 17, 1938 |
| 2,259,034 | Fisher | Oct. 14, 1941 |
| 2,560,073 | Bloomer | July 10, 1951 |
| 2,580,375 | Davis et al. | Dec. 25, 1951 |